(12) United States Patent
Naik (10) Patent No.: US 7,031,996 B2
(45) Date of Patent: Apr. 18, 2006

(54) CALCULATING SQUARE ROOT OF BINARY NUMBERS WITH FIXED-POINT MICROPROCESSOR

(75) Inventor: Apurva D. Naik, Longmont, CO (US)

(73) Assignee: Seagate Technology LLC, Scotts Valley, CA (US)

(*) Notice: Subject to any disclaimer, the term of this patent is extended or adjusted under 35 U.S.C. 154(b) by 646 days.

(21) Appl. No.: 09/892,386

(22) Filed: Jun. 26, 2001

(65) Prior Publication Data

US 2002/0052905 A1    May 2, 2002

Related U.S. Application Data

(60) Provisional application No. 60/245,448, filed on Nov. 2, 2000.

(51) Int. Cl.
*G06F 7/38* (2006.01)

(52) U.S. Cl. .................................................. 708/605
(58) Field of Classification Search ................ 708/605, 708/500

See application file for complete search history.

(56) References Cited

U.S. PATENT DOCUMENTS

| | | | | |
|---|---|---|---|---|
| 3,631,230 A | * | 12/1971 | Chen .......................... | 708/605 |
| 4,477,879 A | | 10/1984 | Wong .......................... | 364/752 |
| 4,805,128 A | * | 2/1989 | Nelsen et al. ................ | 708/204 |
| 4,949,296 A | | 8/1990 | Malinowski ................. | 364/752 |
| 5,128,891 A | | 7/1992 | Lynch et al. ................. | 364/767 |
| 5,157,624 A | * | 10/1992 | Hesson ........................ | 708/605 |
| 5,268,857 A | | 12/1993 | Chen et al. .................. | 364/752 |
| 5,278,782 A | | 1/1994 | Nakano ........................ | 364/752 |
| 5,307,302 A | | 4/1994 | Nakano ........................ | 364/752 |
| 5,386,375 A | | 1/1995 | Smith .......................... | 364/748 |
| 5,430,669 A | | 7/1995 | Chen et al. .................. | 364/752 |
| 5,602,768 A | | 2/1997 | Cunto et al. ................. | 364/748 |
| 5,633,818 A | | 5/1997 | Taniguchi .................... | 364/745 |
| 5,729,481 A | | 3/1998 | Schwarz ...................... | 364/745 |
| 5,787,030 A | | 7/1998 | Prabhu et al. ............... | 364/761 |
| 5,798,955 A | | 8/1998 | Matsubara ............. | 364/736.01 |
| 6,163,791 A | * | 12/2000 | Schmookler et al. ........ | 708/605 |
| 6,341,300 B1 | * | 1/2002 | Shankar et al. ............. | 708/605 |
| 6,349,319 B1 | * | 2/2002 | Shankar et al. ............. | 708/502 |

* cited by examiner

*Primary Examiner*—Tan V. Mai
(74) *Attorney, Agent, or Firm*—David K. Lucente; Derek J. Berger (57) ABSTRACT

A method and system is disclosed for calculating the square root of a number using a fixed-point microprocessor. The method includes employing a binary search to obtain the integer portion of the square root, and calculating a fraction of the square root utilizing the integer portion. The method further includes summing the fractional portion together with the integer portion to yield the square root. Also disclosed is a calculator apparatus for employing the method.

13 Claims, 8 Drawing Sheets

CALCULATING SQUARE ROOT OF BINARY NUMBERS WITH FIXED-POINT MICROPROCESSOR

RELATED APPLICATIONS

This application claims priority of U.S. provisional application Ser. No. 60/245,448, filed Nov. 2, 2000.

FIELD OF THE INVENTION

This application relates generally to numerical calculators and more particularly to calculating square roots of binary numbers using a fixed-point processor.

BACKGROUND OF THE INVENTION

In the field of numerical calculating using systems such as calculators, computers, and software, calculating square roots of numbers is a time consuming task, often requiring a great deal of memory. Calculating square roots is often required in systems in which relatively fast response times and compact size are demanded. For example, in a disc drive, in order to determine the velocity profile during a seek, the square root of a function of disc drive parameters is calculated. Traditional disc drives employ lookup tables having a relatively large set of values used during disc drive operation in order to implement traditional square root algorithms. The look-up tables consume a large amount of valuable non-volatile memory. In the disc drive industry, a continuing push exists to read and write data more quickly from and to the data storage disc. Additionally, as non-volatile memory may greatly increase the cost of a given system, square root calculators employing look-up tables are unsuitable in smaller applications where reduced circuit size and low cost is desirable or necessary.

Many traditional systems utilize fixed-point processors for numerical calculations. A fixed-point processor, or fixed-point microprocessor, is generally an integrated circuit that performs numerical calculations in which the decimal point is always in the same location; that is, there is no variation in precision. Stated another way, the number of bits allocated for the mantissa never changes. Systems that utilize a fixed-point processor are ill-suited for conventional iterative algorithms for calculating a square root.

One problem that arises with a fixed-point processor implementation of square root algorithms is overflow. During iterations of the square root algorithm, intermediate results require more than one register, even though the final answer will generally take up only one register. For example, the Newton-Raphson algorithm (shown below) employs an iterative process in which a seed value (U(0)) is selected and entered into the function to generate a subsequent value (U(1)). The Newton-Raphson function is generally given as:

$$U(i)=\tfrac{1}{2}*(U(i-1)+X/U(i-1)), \qquad (1)$$

where "X" is the number for which the square root is required, U(i) is a subsequent estimate of the square root, and U(i−1) is a prior estimate of the square root. This algorithm is typically repeated until a minimum difference is achieved between U(i) and U(i−1). If this algorithm is implemented with a 16 bit fixed-point microprocessor, values of U(i) can be a 16 bit integer having an 8 bit fraction. Thus, the division step (X/U(i−1)) is more complicated than a single division as shown above. Specifically, to perform the single division may require multiple divisions utilizing more than one divisor stored in more than one register. Thus, processing speed is slowed down.

Another problem with prior approaches is the use of costly non-volatile memory. For example, in order to reduce the time required to generate a square root, typical systems employ look-up tables of "seed" values (e.g., U(0) above). The closer a seed value is to the final answer, the fewer number of iterations are required to generate the square root. As another example, in disc drive applications, look-up tables are employed to provide values related to spin velocity associated with radial distances from the center of the disc. As track density increases on discs, the look-up tables in disc drives increase. Look-up tables are stored in costly non-volatile memory and their use is a drawback of prior approaches. Also, extra overhead involved with looking up the values is cost effective only with high precision (e.g., 32 bit) square root computations, wherein the look-up overhead is small compared to the iteration time saved.

Another problem related to disc drives is the inability in current approaches to dynamically calculate an optimal deceleration during a seek operation. When the disc drive actuator head travels from one track to another, the head accelerates for a given time duration and decelerates for a given time duration. The time duration is based on the distance between two tracks. In prior approaches, one level of deceleration is calculated during manufacture based on the largest distance between two tracks. This level of deceleration is calculated so that the time to move from the first track to the second track is minimized. During runtime, this level of deceleration is undesirable for seeks involving two tracks that are closer than the largest distance. When two tracks used in a seek are relatively close, the acceleration profile is compressed in time, but the deceleration value is not adjusted for the closer tracks. This gives rise to sharp changes in current, resulting in undesirable excitations in resonancies.

Accordingly there is a need for a method and system for calculating square roots at runtime using a fixed-point microprocessor, which is faster than traditional approaches and requires less memory while achieving the same precision as traditional approaches.

SUMMARY OF THE INVENTION

Against this backdrop the present invention has been developed. The present invention includes a method and apparatus for calculating the square root of binary encoded numbers. The present invention significantly increases the speed of traditional methods by reducing the number of iterations required to obtain a desired precision. Memory overhead required by traditional systems to calculate square roots is substantially reduced. An embodiment of the present invention can calculate integer square roots and floating point square roots with equal precision.

The method involves calculating the square root of a number using a fixed-point microprocessor. The method includes employing a binary search to obtain the integer portion of the square root, and calculating a fraction of the square root utilizing the integer portion. The method further includes summing the fractional portion together with the integer portion to yield the square root.

A calculator apparatus employs the method for calculating a square root. The calculator includes a binary search module for obtaining the integer portion of the square root. The calculator also includes a fraction calculating module for calculating the fractional portion of the square root using the integer portion. The calculator further includes a summing module for summing the fractional portion together with the integer portion to yield the square root.

These and various other features as well as advantages which characterize the present invention will be apparent from a reading of the following detailed description and a review of the associated drawings.

DETAILED DESCRIPTION

The invention is described in detail below with reference to the drawing figures. When referring to the figures, like structures and elements shown throughout are indicated with like reference numerals.

Figure 1:
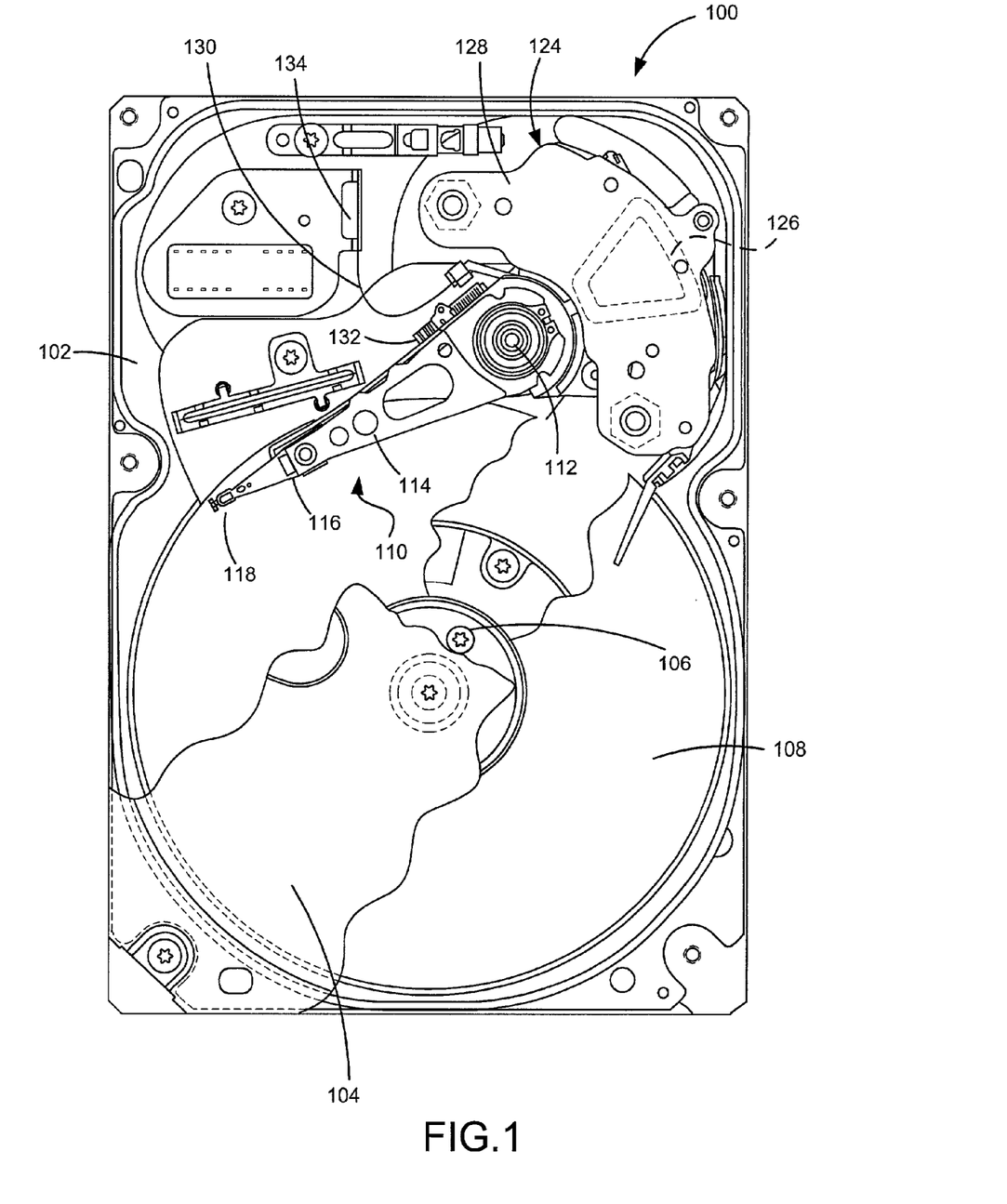
FIG. 1 is a plan view of a disc drive incorporating an embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
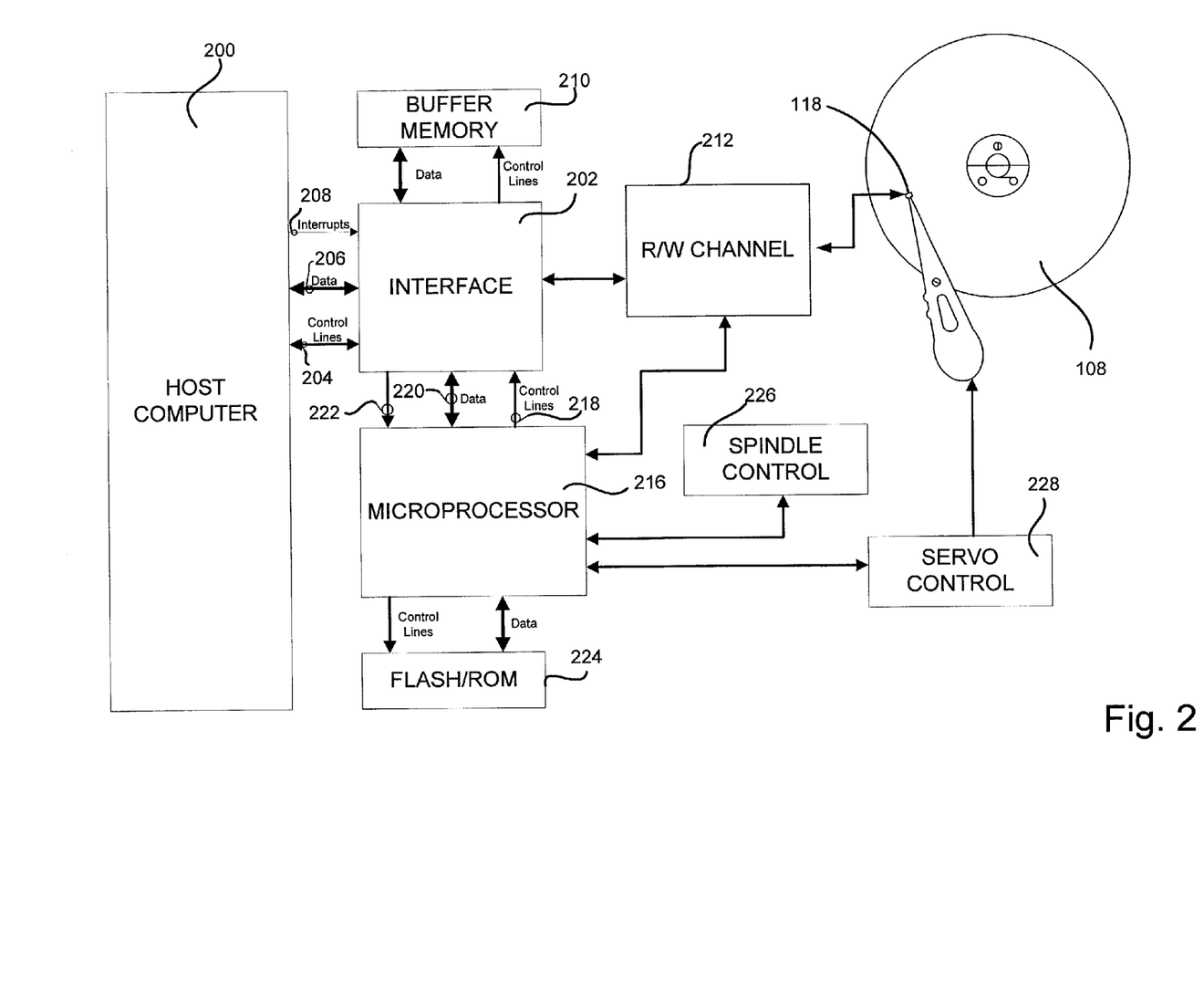
FIG. 2 is a functional block diagram of the disc drive of FIG. 1 in accordance with a preferred embodiment of the present invention.

FIG. 2 is a functional block diagram of the disc drive 100 of FIG. 1, generally showing the main functional circuits which are typically resident on a disc drive printed circuit board and which are used to control the operation of the disc drive 100. As shown in FIG. 2, the host 200 is operably connected to an interface application specific integrated circuit (interface) 202 via control lines 204, data lines 206, and interrupt lines 208. The interface 202 typically includes an associated buffer 210 which facilitates high speed data transfer between the host 200 and the disc drive 100. Data to be written to the disc drive 100 are passed from the host 200 to the interface 202 and then to a read/write channel 212, which encodes and serializes the data.

The read/write channel 212 also provides the requisite write current signals to the heads 214. To retrieve data that has been previously stored by the disc drive 100, read signals are generated by the heads 214 and provided to the read/write channel 212, which processes and outputs the retrieved data to the interface 202 for subsequent transfer to the host 100. Such operations of the disc drive 200 are well known in the art and are discussed, for example, in U.S. Pat. No. 5,276,662 issued Jan. 4, 1994 to Shaver et al.

As also shown in FIG. 2, a microprocessor 216 is operably connected to the interface 202 via control lines 218, data lines 220, and interrupt lines 222. The microprocessor can be any microprocessor, including, but not limited to, a fixed-point microprocessor, such as an STMicroelectronics ST10 microprocessor or a Motorola 6800 microprocessor. The microprocessor 216 provides top level communication and control for the disc drive 200 in conjunction with programming for the microprocessor 216 which is typically stored in a microprocessor memory (MEM) 224. The MEM 224 can include random access memory (RAM), read only memory (ROM), and other sources of resident memory for the microprocessor 216. Additionally, the microprocessor 216 provides control signals for spindle control 226, and servo control 228.

During operation, servo control 228 sends signals to the actuator assembly 110 to move a selected head 118 from one disc track to another. One control method known in the art for controlling the position and velocity of the head 118 is velocity mode control. The output of the servo control 228 is a current that is proportional to a desired acceleration. The microprocessor 216 generates a value that is sent to the servo control 228 to indicate the desired acceleration. The microprocessor 216 calculates a value representing a velocity reference. The current from the servo control 228 is adjusted to cause a change in the velocity of the head 118, so that the velocity of the head 118 is substantially equal to the velocity reference. The velocity reference is an ideal velocity of the transducer head 118. It can been shown using standard Newtonian physics that the velocity reference at any time, t, is given by the equation $$v(t)=\text{Sqrt}(2*a_0*x(t)), \quad (2)$$

where $a_0$ is a constant deceleration value, and $x(t)$ is the position of the actuator at time t. Thus, at time, t, the microprocessor 216 calculates the square root of a function of disc drive parameters. Values $a_0$ and $x(t)$ are known, so the microprocessor first multiplies $2*a_0* x(t)$ to get a number. The function $v(t)$ may be viewed as a velocity profile over time. After the number is calculated, the number's square root is desired. The process of calculating the square root of the number is illustrated in the embodiments shown in the FIGS. 3–6.

To summarize the seek operation, a selected head 118 is moved from an initial track to a destination track on the associated disc surface. A velocity controlled approach is used wherein a velocity profile, indicative of a desired velocity trajectory for the head, is selected based on the distance between the initial and destination tracks. The head is first accelerated to a maximum velocity through the application of a large magnitude of current to the coil. The head then is maintained at this maximum velocity until it reaches a predetermined distance from the destination track, at which point a large amount of current of opposite polarity is applied to the coil to decelerate and settle the head onto the destination track. Adjustments in the velocity of the head are repetitively made during the seek in relation to the difference between the actual velocity and the velocity profile. The desired velocity at any given point during the seek is referred to as a reference velocity, with the velocity profile comprising a series of reference velocity values.

The embodiments discussed herein utilize the following identities for the square root of a number:

$$\text{Number}=(\text{Sqrt\_Integer}+\text{Sqrt\_Fraction})^2, \quad (3)$$

$$\text{Square Root}=(\text{Sqrt\_Integer}+\text{Sqrt\_Fraction}), \quad (4)$$

where Number is the number for which a square root is desired, Square Root is the square root of Number, Sqrt_Integer is the integer portion of Square Root, and Sqrt_Fraction is the fractional portion of Square Root.

Equation (3) can be further developed as shown below:

$$\text{Number}=\text{Sqrt\_Integer}^2+2*\text{Sqrt\_Integer}*\text{Sqrt\_Fraction}+\text{Sqrt\_Fraction}^2 \quad (5)$$

In this form, useful equations can be developed that are easily implemented in a fixed-point microprocessor. Setting aside the Sqrt_Fraction portion for the moment, the following approximation is obtained:

$$\text{Number}\approx\text{Sqrt\_Integer}^2. \quad (6)$$

As will be shown, in one embodiment of the present invention, Sqrt_Integer can be relatively quickly determined using a binary search in a fixed-point microprocessor. If it is assumed for the moment that Sqrt_Fraction$^2$ is much less than the value (2*Sqrt_Integer*Sqrt_Fraction), a more precise calculation of the square root can be obtained using the following equation:

$$\text{Sqrt\_Fraction}=(\text{Number}-\text{Sqrt\_Integer}^2)/(2*\text{Sqrt\_Integer}). \quad (7)$$

Equation (7) is easily implemented on a fixed-point processor. Using equation (6) to obtain the integer portion of the square root, and equation (7) to obtain the fractional portion, the two parts can be added to obtain a square root value for the number that is precise enough for most applications.

However, for small values of Number, ignoring Sqrt_Fraction$^2$ introduces an error that can be practically eliminated using a scaling procedure. In one embodiment, for smaller values of Number, the following equation can be employed to yield highly accurate results:

$$\text{Square Root}=(\text{sqrt}(\text{Number}*64)/8). \quad (8)$$

In operation, implementing equation (8) involves prescaling the smaller numbers by multiplying by 64. After prescaling, the square root is determined using the equations above. After the square root is determined, a post scaling operation is employed by dividing the square root by the square root of 64, which is 8. This can be viewed as making less significant parts of Number more significant temporarily to achieve a higher precision square root value.

Equation (8) is particularly well-suited for a 16 bit fixed-point microprocessor when Number is less than 1000, because the largest number that can be represented in one 16 bit register is 65,535. So, using equation (8), Number is increased by the largest integer factor possible, while still remaining in one register. In other microprocessors, such as a 32 bit fixed-point microprocessor, the scaling values are preferably adjusted to achieve higher resolution. Prescaling and post-scaling operations will be discussed with reference to the embodiment shown in FIG. 4.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 3:
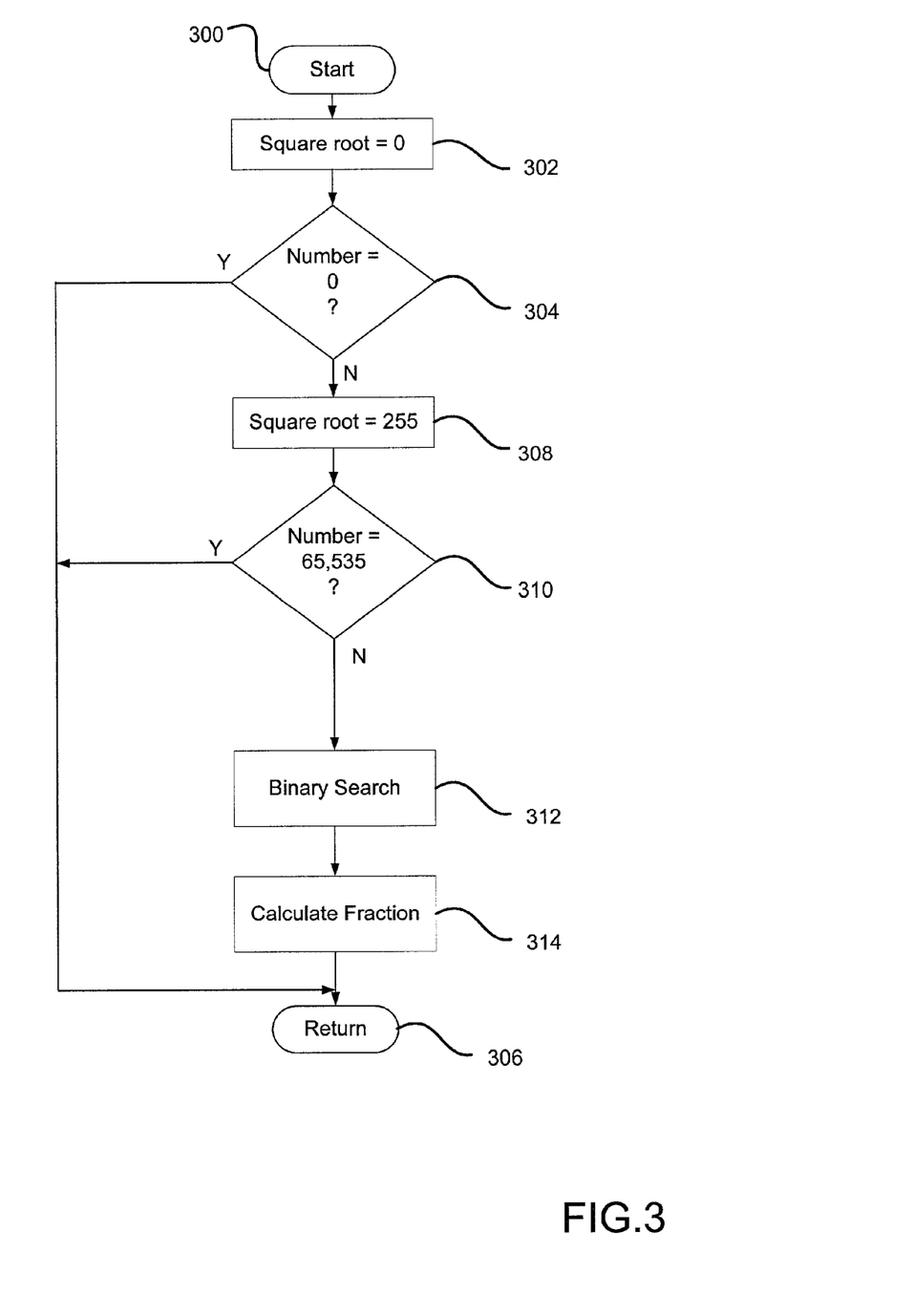
FIG. 3 is a flow chart of the square root calculation subroutine in accordance with a preferred embodiment of the present invention.

FIG. 3 is a flow chart of the square root calculation subroutine in accordance with a preferred embodiment of the present invention. The embodiment shown in FIG. 3 is intended for a sixteen bit fixed-point microprocessor, such as the ST10. Control initially transfers to a start operation 300 wherein initialization processing occurs. Control then transfers to a square root operation 302 wherein the square root value is set equal to zero. Control then transfers to a determining operation 304 wherein it is determined whether the number is equal to zero. If the number is equal to zero then the square root of the number is zero and control transfers to a return operation 306 wherein the square root is returned to the calling subroutine. If the number in the determining operation 304 is determined to be nonzero, control transfers to a square root operation 308. In the square root operation 308 the square root is set equal to 255. The number 255 is chosen in accordance with a 16-bit microprocessor such that the largest square root that occurs is 255. In other embodiments, the square root will be set equal to a different value depending on the bit size of registers in the microprocessor that is used. For example, in a 32 bit fixed-point microprocessor, the largest square root that could occur is 65,536. Thus, in a 32 bit microprocessor the value 65,536 would be used in the square root operation 308, rather than the value 255.

After the square root operation 308, control transfers to a determining operation 310, where it is determined whether the number is equal to the maximum value that can be stored in a register of the microprocessor. In a 16-bit microprocessor the maximum value is 65,535. In the embodiment of FIG. 3, if the number in the determining operation 310 is 65,535, control transfers to the return operation 306, wherein the value 256 (the square root of 65,535) is returned to the calling subroutine. If the number in the determining operation 310 is not equal to 65,535, control transfers to a binary search operation 312. In the binary search operation 312 a binary search is performed to obtain the integer part of the square root of the number. The binary search operation 312 will be discussed in more detail in the embodiment of FIG. 5. After the binary search operation 312, control transfers to a calculating operation 314 wherein the fraction portion of the square root is calculated. The calculating operation 314 will be discussed in more detail in reference to FIG. 6.

Those skilled in the art will recognize that the time it takes to perform the operations illustrated in FIG. 3 will vary depending upon the original number for which a square root is required. For example, if the original number is zero, the process of calculating the square root merely involves setting the return square root value equal to zero, and neither the processing of the binary search operation 312 nor the calculating operation 314 will occur. Thus, the process of calculating the square root of zero (and 65,535) will be much faster than calculating the square root of other numbers, for which the binary search operation 312 and the calculating operation 314 are required. Some applications that are time sensitive require that the times to calculate the square roots be substantially equal. Thus, in accordance with another embodiment of the present invention, steps 302, 304, 308, 310, need not be implemented in order to increase the amount of time it takes to calculate the square root of zero and the maximum value (e.g., 65,535 for a 16-bit processor). This embodiment may be useful in applications where it is important that the time to calculate the square root is substantially equal from one square root calculation to the next. Steps 302, 304, 308, and 310 represent a check for boundary conditions, and speed up the calculation of the square root for the minimum and maximum numbers.

In accordance with another embodiment of the invention, to make execution time substantially constant, the boundary condition checks are eliminated, and the maximum number of iterations is carried out in the binary search operation 312, to be discussed later. A first square root calculation may involve only 6 iterations in the binary search operation 312 to arrive at the integer value; however, a second square root calculation may involve 8 iterations in the binary search operation 312 to arrive at the integer value. To equalize the time required to arrive at both integers, the embodiment forces the number of iterations to 8 for both calculations. One way of ensuring 8 iterations in the first calculation is to store the integer value after the 6th iteration, and then repeat the binary search 2 more times. Forcing 2 more iterations will not change the integer value, but will ensure constant execution time. Preferably, the number of iterations is forced to the maximum number possible in the binary search. The maximum number of iterations possible depends on the size of the registers in the microprocessor. In a 16-bit microprocessor, the force value is 8 iterations.

Figure 4:
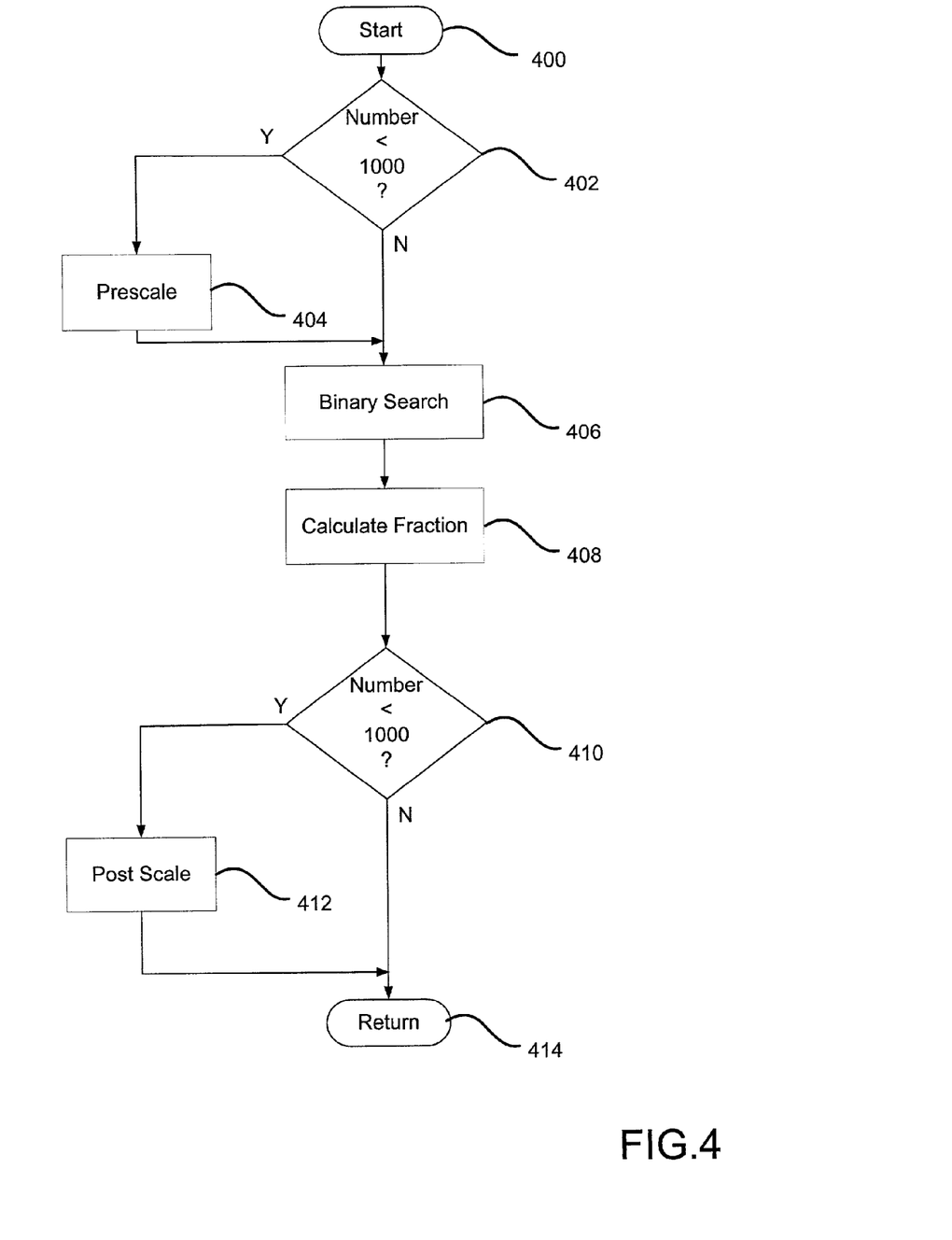
FIG. 4 is a flow chart of the square root calculation subroutine in accordance with an embodiment of the present invention.

FIG. 4 illustrates a representation of the square root calculation subroutine in accordance with an embodiment of the present invention. Control initially transfers to a start operation 400 where initialization processing is performed. Control then transfers to a determining operation 402, where it is determined whether the number is less than a thousand. If the number is less than a thousand, control transfers to a prescaling operation 404 wherein the number is prescaled for a desired level of precision. In a 16-bit fixed-point microprocessor, the prescaling operation 404 preferably involves multiplying the number by 64. Thus in a 16-bit fixed-point microprocessor, multiplying the number by 64 will not cause an overflow. In other words, the maximum value generated by 64 times the number is not greater than 65,535. The number used for comparison in the determining step 402 is preferably adjusted depending on the size of the registers in the microprocessor. The number one thousand is preferable, but not required, in a 16-bit microprocessor because one thousand times 64 is 64,000 and will not be greater than 65,535, the maximum value for a 16-bit microprocessor.

Alternatively, in a 32-bit microprocessor, the number used for comparison in the determining operation 402 would preferably be one million, and the prescaling value of prescaling operation 404 would be two to the twelfth or 4,096. If the number in the determining operation 402 is not less than one thousand, control transfers to a binary searching operation 406. The binary searching operation 406 will be discussed in more detail with reference to the embodiment in FIG. 5. As another example, an 8-bit microprocessor could be used wherein the comparison value can be 16, and the prescale value can be 16 ($2^4$).

Control then transfers to a calculating operation 408 wherein a fractional portion of the square root is calculated. The calculating operation 408 will be discussed in more detail in reference to the embodiment of FIG. 6. Control then transfers to determining operation 410 wherein it is again determined whether the number is less than one thousand. If the number is determined to be less than one thousand, control transfers to a post scale operation 412 wherein the square root is scaled to adjust for the prescaling that occurred in the prescale operation 404. The value used for postscaling in postscale operation 412 corresponds to the value used in the prescaling operation of 404 to achieve the desired level of precision. Thus, the square root is postscaled by 8 in postscaling operation 412; that is, the square root is divided by 8 to achieve the desired precision. If the number is not less than one thousand in the determining operation 410, control transfers to a returning operation 412. In the returning operation 412, the square root is returned to the calling subroutine.

Figure 5:
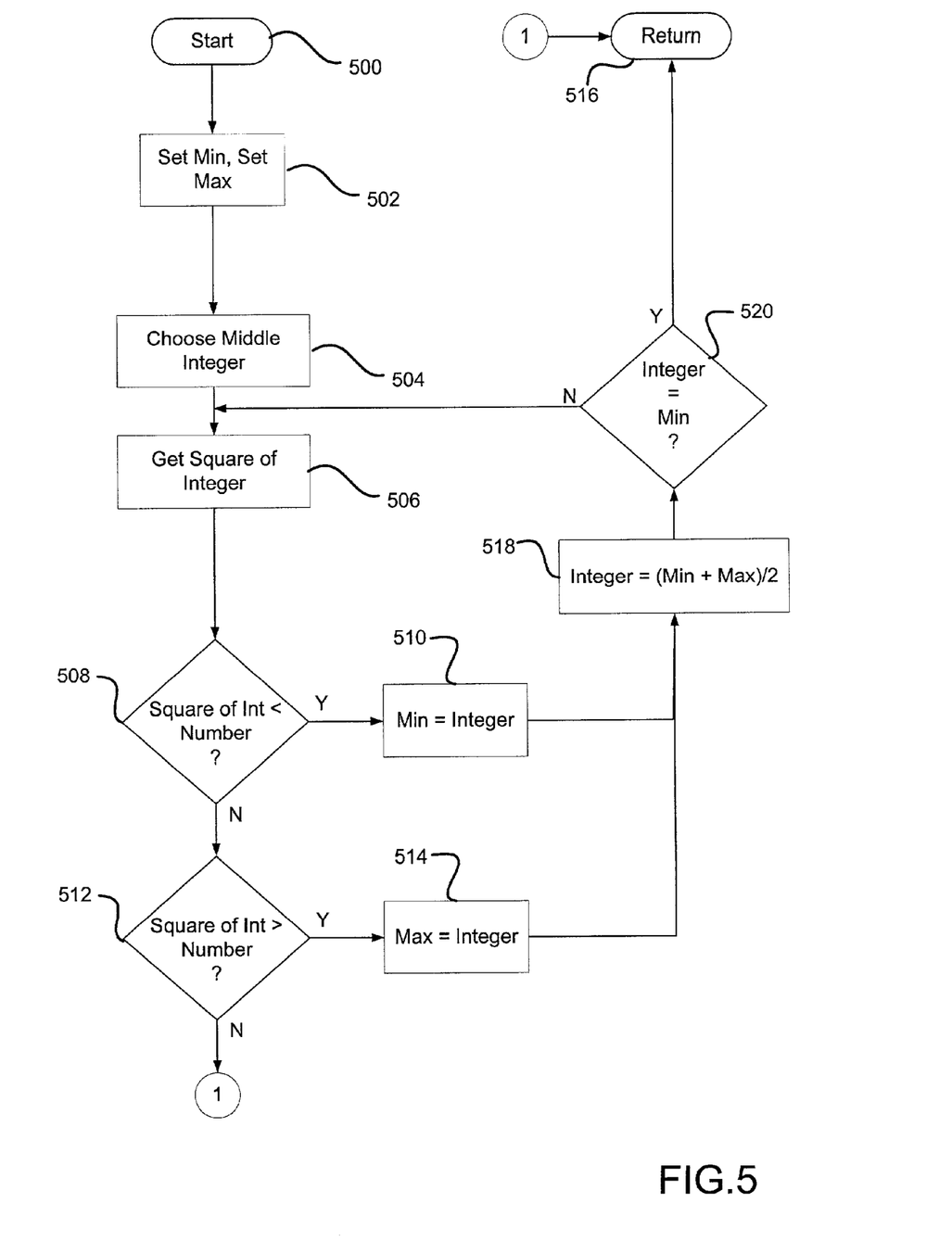
FIG. 5 is a flow chart of the binary integer search subroutine in accordance with an embodiment of the present invention.

FIG. 5 illustrates a flow chart of the binary integer search subroutine in accordance with an embodiment of the present invention. Control transfers to a start operation 500 wherein initialization processing occurs. Control then transfers to a set operation 502 wherein a minimum value is set and a maximum value is set. The minimum and maximum values are used in the binary search to locate the integer portion of the square root of the number. As will be shown the minimum and maximum values are adjusted throughout the search to narrow the range of integer values until the desired integer is located. Control then transfers to a choosing operation 504 wherein a middle integer is chosen. In a 16-bit fixed-point microprocessor, the middle integer will equal 128. The value 128 is used for a 16-bit microprocessor because when 8 bits are used as the integer portion of the square root, the maximum integer value is 255 and the minimum integer value is zero. Thus the midrange of possible integers is 128. In accordance with the binary search, searching begins with 128, the midrange possible integers in a 8 bit representation of the integer. Alternatively in a 32-bit fixed-point microprocessor wherein 16 bits are used to represent the integer portion of the square root, the initial midpoint of possible integers is 65,536. The initial middle integer value of the choosing operation 504 should be adjusted for the bit register size of the microprocessor being used.

After the middle integer is chosen in operation 504, control transfers to the squaring operation 506 wherein the square of the integer is obtained. In the squaring operation 506, the integer chosen in operation 504 is squared. In an alternative embodiment, a lookup table could be used that has the square of each integer. The lookup table approach would include a table that stores the square of every possible integer. When the square of an integer is required, the table is indexed with the integer and the square of the integer is retrieved from the table. After the square of the integer is obtained, control transfers to the determining operation 508 wherein it is determined whether the square of the integer is less than the number for which the square root is sought. If the square of the integer is less than the number, control transfers to an adjusting operation 510 wherein the minimum value is set equal to the integer. The effect of setting the minimum value equal to the integer is to narrow the range of integers in the square root determination process.

If, on the other hand, the square of the integer is not less than the number, control transfers to the determining operation of 512 wherein it is determined whether the square of the integer is larger than the number. If the square of the integer is larger than the number, control transfers to the adjusting operation 514. In the adjusting operation 514 the maximum value is set equal to the integer. By setting the maximum value equal to the integer in the adjusting operation 514, the range of possible integers is narrowed. If, in the determining operation 512, it is determined that the square of the integer is not greater than the number, control transfers to a returning operation 516 wherein the integer is returned to the calling subroutine. It will be apparent to the reader that if the square of the integer is neither less than the number in operation 508, nor greater than the number in operation 512, then the square of the integer equals the number and the integer is the square root of the number and should be returned.

After the minimum value is adjusted in operation 510 or the maximum value is adjusted in operation 514, control transfers from those operations to the dividing operation 518. In the dividing operation 518, the integer is set equal to the integer that is at the midrange between the minimum and maximum value. Determining the midrange between the minimum and maximum values is preferably performed by adding the minimum value to the maximum value and dividing the sum by two. The operation performed in operation 518 can be viewed as an averaging operation. After a new integer is determined in the dividing operation 518, control transfers to the determining operation 520, wherein it is determined whether the integer is equal to the minimum value and the maximum number of iterations has been executed. If the integer is not equal to the minimum value or the maximum number of iterations has not been executed, control transfers back to the squaring operation 506. If the integer is equal to the minimum value and the maximum number of iterations has been executed, control transfers to the returning operation 516 wherein the integers returned and controlled transfers back to the calling subroutine. The reader will recognize that if the integer in the determining operation 520 is equal to the minimum value, then the integer is the closest integer value to the square root of the number. In other words, when the integer equals the minimum value, one plus the integer yields an integer that is greater than the square root of the number. Thus, the integer that is returned in the return operation 516 is either equal to the square root of the number, or is less than the square root by a fraction.

Furthermore, as has been mentioned, the embodiment ensures substantially constant execution time. In the determining operation 520, the maximum number of iterations is checked. The binary search operation 312 only returns if the maximum number of iterations has been reached. If the integer has been determined, but the maximum number of iterations has not been executed, the binary search will continue at the squaring operation 506. As has been mentioned, iterating through the operation again will not change the integer value. The maximum iteration value depends upon the register size of the microprocessor. For a 16-bit microprocessor, the maximum number of iterations is 8. For a 32-bit microprocessor, the maximum number of iterations is 16. One skilled in the art will recognize that delaying the return from the binary search operation is not necessary. Delaying the return of the integer value is useful in an embodiment where constant execution time is preferable.

Figure 6:
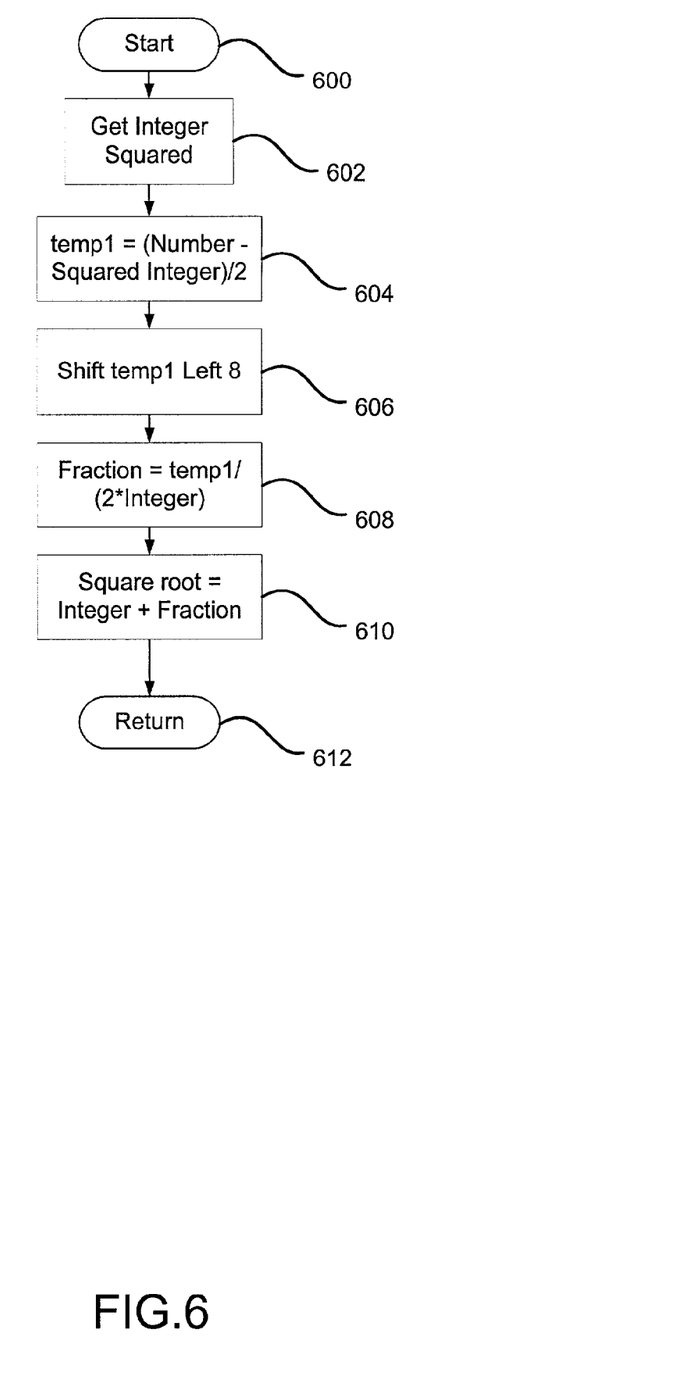
FIG. 6 is a flow chart of the fraction calculation subroutine in accordance with an embodiment of the present invention.

FIG. 6 is a flow chart illustrating a method of calculating the fraction in accordance with an embodiment of the present invention. The embodiment shown in FIG. 6 is suited for a 16-bit fixed-point microprocessor. As was discussed earlier, in an embodiment using a 16-bit microprocessor, 8 bits are used to represent the integer while another 8 bits are used to represent the fractional portion of the square root. The method of calculating a fractional portion in FIG. 6 begins with a starting operation 600 wherein initialization processing occurs. Control then transfers to a squaring operation 602 wherein the previously determined integer is squared. Alternatively, a lookup table can be employed that stores squares of all possible integer values, so that the square of any integer can be looked up. Control then transfers to a temporary operation 604 wherein an intermediate value is calculated as a function of the number and the square integer. In accordance with the equation developed earlier for fractional portion, the intermediate number calculated in operations 604 is the difference between the number and the squared integer divided by 2.

Control then transfers to the shifting operations 606 wherein the intermediate value previously calculated is shifted left by 8. Shifting the intermediate value left by 8 can be viewed as multiplying the value by 256, or 2 to the power of 8. Control then transfers to a calculating operation 608 wherein the fractional value square root is calculated. In accordance with the equation shown earlier the fractional portion of the square root is equal to the intermediate value determined in the shifting operation 606 divided by 2 times the integer. In another embodiment, the divide by 2 operation in the calculating operation 608 can be moved into the shifting operation 606. In that embodiment, a shift left of 7 will occur in the shifting operation 606, and the function in the calculating operation 608 will not involve a divide by 2. Control then transfers to a summing operation 610. In the summing operation 610, the square root is calculated by adding the integer to the fractional portion. As was discussed earlier, in a 16-bit fixed-point microprocessor, the square root, which is determined in the summing operation 610 is a 16-bit value, wherein the highest order 8 bits represent the integer portion, and the lowest order 8 bits represent the fractional portion. Alternative embodiments employing microprocessors with sizes other than 16 bits, the bit size of a square root will be adjusted accordingly. For example in a 32-bit microprocessor, 16 bits will be used for the integer and a different 16 bits will be used for the fractional portion. After the square root is calculated in the summing operation 610, control transfers to the return operation 612 wherein the square root is returned to the calling subroutine.

Figure 7:
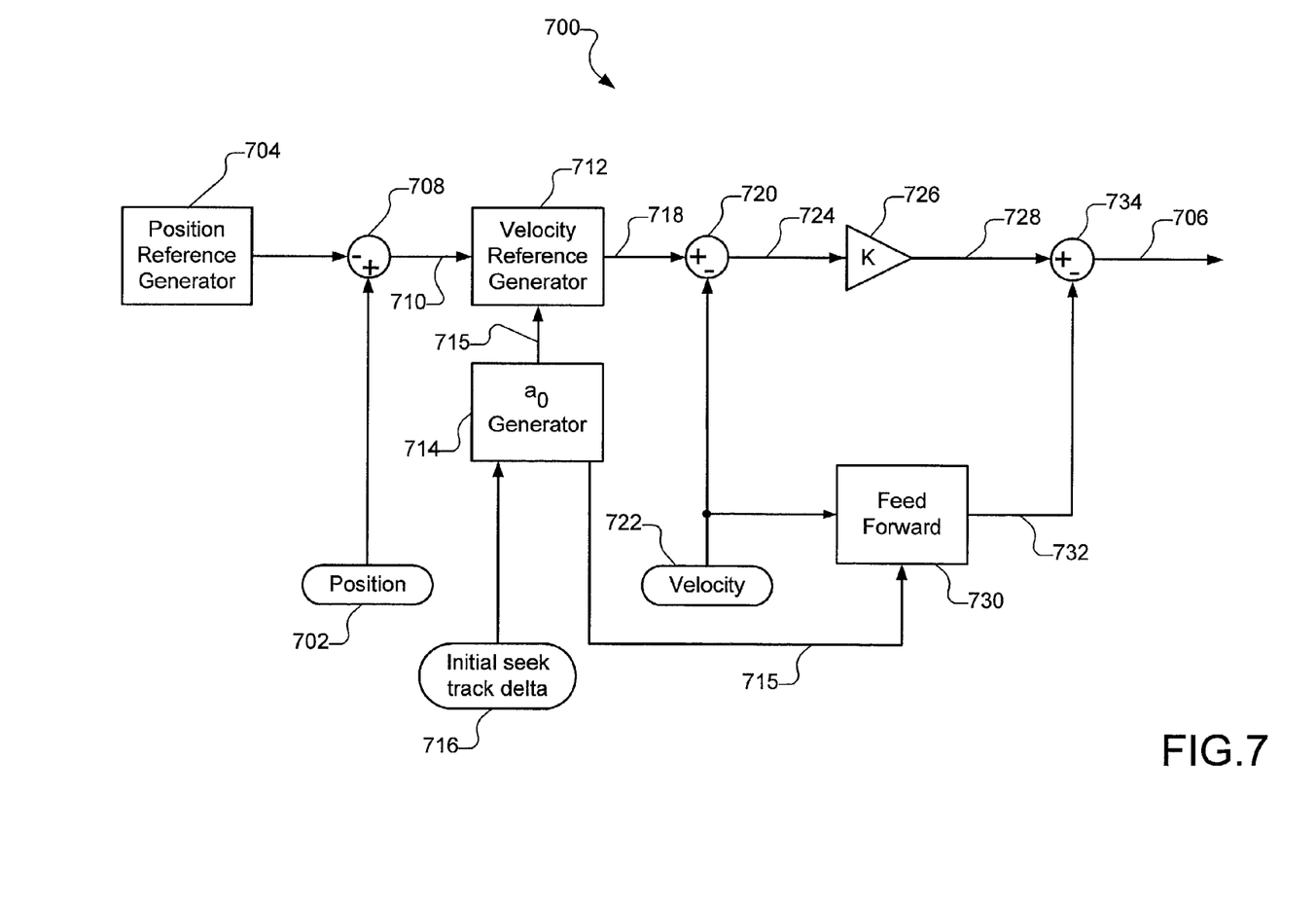
FIG. 7 is a block diagram of an operating environment of an embodiment of the present invention.

FIG. 7 is a block diagram of an operating environment utilizing an embodiment of the present invention. In a disc drive, during a seek operation, the disc drive actuator head accelerates and then decelerates to move from a first track to a second track. The deceleration value is proportional to a current signal, which is generated by the servo control 228. The starting formula is equation (2), which is repeated here for convenience:

$$v(t)=\text{Sqrt}(2*a_0*x(t)). \tag{2}$$

As discussed earlier, this formula is derived from basic newtonian calculus, which gives mathematical relationships between velocity, position, and acceleration. In the disc drive, the value x(t) generally represents a differential position at time t. The value x(t) can be viewed as the difference between the current track and the second track as the head moves from the first to the second track. The value v(t) represents a velocity reference by which the current velocity should be adjusted. The value $a_0$ represents a constant deceleration at which the actuator head will decelerate as it moves from the first track to the second track.

The value v(t) in equation (2) can be graphed to create a velocity profile over time. Preferably, the actual velocity of the actuator head follows the velocity profile and when the actuator head is at the desired track, the value v(t) is equal to zero. As will be shown, the equation (2) is used to generate a current which is proportional to an acceleration which is output by the servo control 228 shown in FIG. 2.

In one embodiment, a servo control system of the disc drive may employ only equation (2) to yield the profile v(t). In another embodiment, the velocity profile v(t) can be changed at a specified time, t, or position, x(t) as the actuator head moves from one track to the next. Employing more than one velocity profile may be desirable to create an overall velocity profile, v(t), which is substantially linear. For example, the square root velocity profile of equation (2) could be used in conjunction with an exponential profile. In the embodiment, it can be shown that the velocity profile, v(t) is given by the equation:

$$v(t)=A_{sched}*X_S, \tag{9}$$

where $A_{sched}$ represents the inverse of an exponential time constant, and $X_S$ represents a switch position at which the velocity profile switches from the square root profile, equation (2), to the exponential profile, equation (9).

Those skilled in the art will readily recognize that any combination of velocity profiles can be employed to yield an overall velocity profile that is suitable for the application. In an embodiment that employs more than one velocity profile, the differential value x(t) of equation (2) is preferably reduce by some offset value, $x_{os}$, which represents the position of the actuator when the switch is made from the square root velocity profile to a subsequent velocity profile. What will be shown next is an exemplary implementation of the equations shown above. The equations can be implemented in hardware or software, and the modules shown in FIG. 7 are not limited to either hardware or software implementations.

Turning now to the block diagram of FIG. 7, a seek profile generator 700 for a disc drive is shown which implements the equations shown above. The seek profile generator 700 receives a current position 702 and a reference position 704 as inputs and transmits a control command 706, which is used to drive the servo control 228. In the embodiment of FIG. 7, the position reference 704 is the desired track to which the actuator head is to move. The position 702 is the current position of the actuator head, and can be a track number given by the feedback control loop in the disc drive 100. The position reference value 704 is subtracted from the position value 702 at a summer module 708. The output of the summer module 708 is a position error signal 710. The position error signal 710 is input to a velocity reference generator 712. The velocity reference generator 712 also receives an input from a constant deceleration ($a_0$) generator 714. The constant deceleration generator 714 generates a constant deceleration value 715 based on the initial seek distance 716.

Using the constant deceleration value 715 and the position error signal 710, the velocity reference generator 712 generates a velocity reference value 718 using the equation (2). The velocity reference generator 712 can implement any of the embodiments of the present invention discussed in reference to FIGS. 3–6. The velocity reference value 718 is sent to a second summer module 720, which subtracts the current velocity 722 from the velocity reference value 718. The second summer module 720 generates a velocity error signal 724, which is transmitted to an amplifier 726. The amplifier multiplies the velocity error signal 724 by some predetermined value to produce a gained velocity error signal 728. A feed forward module 730 receives two inputs, velocity 722, and the constant deceleration value 715 and generates a feed forward signal 732. The feed forward module 730 preferably multiplies the constant deceleration value 715 by a scale factor. The feed forward signal 732 is transmitted to a third summer 734. The third summer module 734 subtracts the feed forward signal 732 from the gained velocity error signal 728 to yield the output control command 706.

The constant deceleration generator 714 generates the deceleration constant 715 ($a_0$). The constant deceleration generator 714 employs a function of the position error 710, available current in the disc drive coil (126 of FIG. 1), and a constant relating the current coil to the actuator acceleration. One exemplary function that the constant deceleration generator may employ is:

$$a_0=a_{0\_}\min+K*\text{SeekLength}, \tag{10}$$

wherein $a_0$ is the deceleration constant 715, K is a non-negative constant, and SeekLength is the initial track distance of a seek. Equation (10) is one embodiment that ensures that the deceleration constant 715 will not be less than a minimum value ($a_{0\_}\min$). In contrast to prior approaches, the constant deceleration value 715 is a function of the initial track distance 716. Those skilled in the art will recognize that the function for $a_0$ can be adjusted so that a smoother acceleration profile is output by the seek profile generator 700, resulting in a smoother current fluctuation from the servo control.

To summarize, an embodiment of the present invention may be viewed as a square root calculator (such as FIG. 3) having a binary searching module (such as 312) that accepts (such as 500) a number, performs a binary search operation (such as FIG. 5), and returns (such as 516) an integer portion of the square root of the number. An embodiment may include a fraction calculating module (such as 608) that calculates a fractional portion of the square root. The embodiment preferably includes a summing module (such as 610) that sums the integer portion and the fractional portion to obtain the square root.

Another embodiment may include a prescaling module (such as 402 and 404) that scales the number if the number is smaller than a desired maximum value prior to calculating the square root of the number. Scaling preferably includes multiplying (such 404) the number by a fixed scale value to increase the significance of the bits. The embodiment also includes a postscaling module for (such as 410 and 412) that scales the square root if the number is smaller than a desired maximum value. Further, an embodiment can include a lower boundary condition module (such as 304) operable to determine whether the number is zero and setting (such as 302) the square root equal to zero if the number is zero. Additionally, the square root calculator can include an upper boundary condition module (such as 310) operable to determine whether the number is a maximum value and setting (such as 308) the square root equal to the square root of the maximum value.

An embodiment may further include a delay module (such as 520) operable to delay the returning (such as 516) of the integer portion so that time to perform the binary search operation is constant. Additionally, an embodiment may include a fixed-point microprocessor (such as 216) having a register operable to store the integer portion and the fractional portion.

An embodiment of the invention may include a method of calculating the square root of a number by performing (such as 406) a binary search to obtain an integer portion of the square root. The embodiment may include a calculating step (such as 408) whereby a fractional portion of the square root is calculated. The embodiment may additionally include an adding step (such as 610) whereby the integer portion is added to the fractional portion to obtain the square root. Further, a prescaling step (such as 404) may be included whereby the original number is scaled to increase the significance of the bits. Additionally, a postscaling step (such as 412) is preferably included to increase the precision of the square root.

Another embodiment may include boundary condition steps to quickly compute the square root without complex calculations. This embodiment preferably includes steps of determining (such as 304) whether the original number is zero and setting (such as 302) the square root equal to zero if the number is zero. An embodiment may also include steps of determining whether the number is the maximum value (such as 310), and if it is, setting (such as 308) the square root equal to the square root of the maximum value. An embodiment can further include performing (such as 520) a predetermined minimum number of iterations of the binary search every time the binary search is performed to ensure that every performance of the binary search is substantially equal in time duration.

One embodiment of the invention is a disc drive (such as 100) that includes an actuator arm (such as 114) that includes a transducer head (such as 118) for reading and writing data from and to the data disc (such as 104). Preferably, the disc drive includes a means (such as 712) for calculating a velocity reference (such as 718) for use in adjusting the velocity of the transducer head (such as 118) to achieve the velocity reference (such as 718). A seek profile generator (such as 700) may be included to generate a velocity profile while the transducer head (such as 118) moves from one track to another track on the data disc (such as 104). The seek profile generator (such as 700) may include a velocity reference generator (such as 712) that is operable to calculate the square root of a function of a position error (such as 710) and a deceleration constant (such as 715). A constant deceleration generator (such as 714) may be included to calculate the deceleration constant (such as 715) based in part on initial seek distance.

Figure 8:
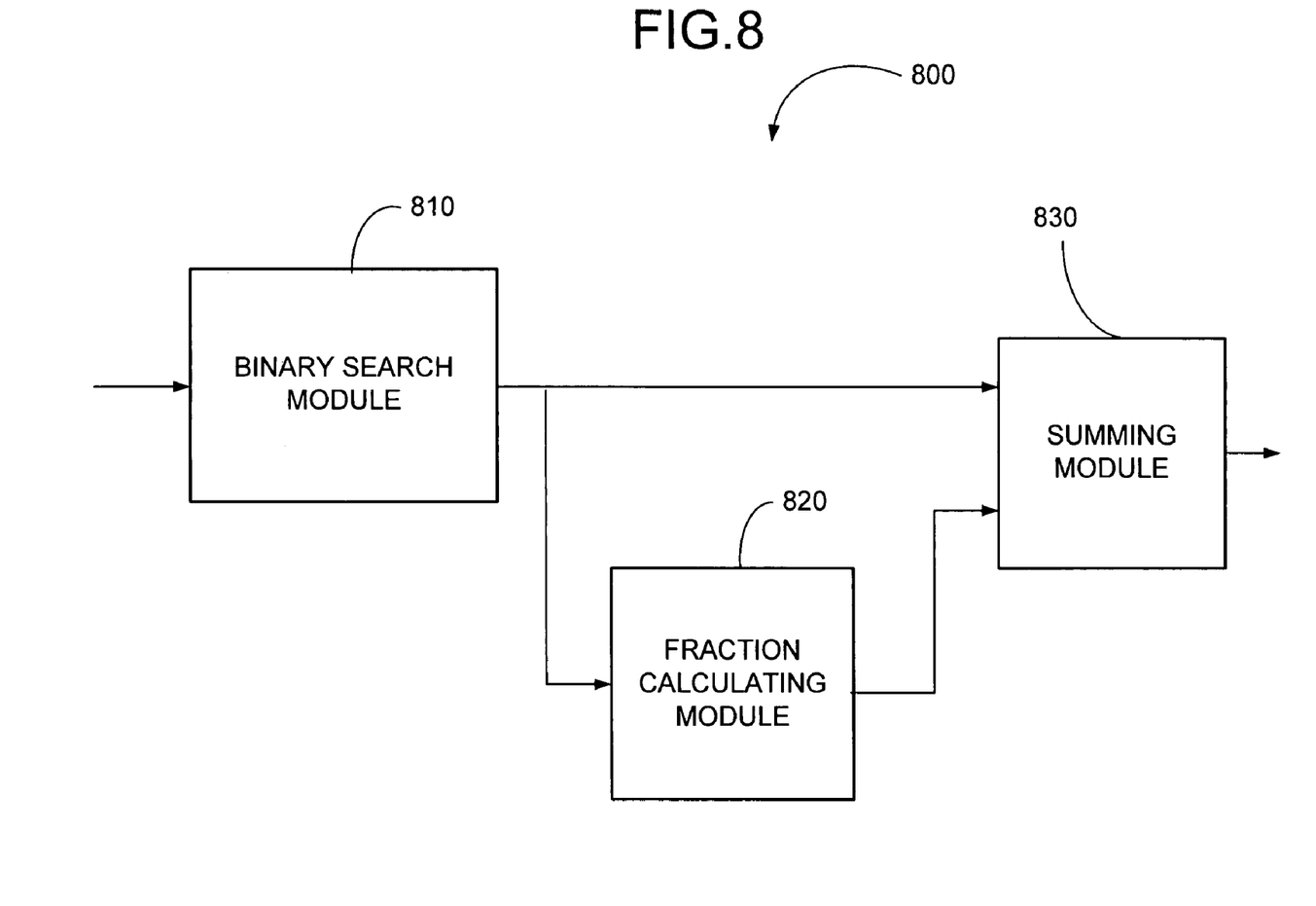
FIG. 8 is a block diagram of an aspect of the present invention.

FIG. 8 shows a square root calculator 800 comprising a binary searching module 810 operable to accept a number, perform a binary search operation, and return an integer portion of the square root of the number. Also shown is a fraction calculating module 820 operable to calculate a fractional portion of the square root and a summing module 830 operable to sum the integer portion and the fractional portion to obtain the square root.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the methods described can be employed in any application where square roots are calculated, such as hand-held calculators, or wrist-watch calculators. Numerous other changes may be made which will readily suggest themselves to those skilled in the art and which are encompassed in the spirit of the invention disclosed and as defined in the appended claims.

What is claimed is:

1. A square root calculator comprising:
    a binary searching module operable to accept a number, perform a binary search operation, and return an integer portion of the square root of the number;
    a fraction calculating module operable to calculate a fractional portion of the square root; and
    a summing module operable to sum the integer portion and the fractional portion to obtain the square root.

2. The square root calculator of claim 1, wherein the square root has a precision and the number comprises bits having varying degrees of significance, the calculator further comprising:
    a prescaling module operable to scale the number if the number is smaller than a desired maximum value prior to calculating the square root of the number, wherein scaling includes multiplying the number by a first fixed scale value to increase the significance of the bits; and
    a postscaling module operable to scale the square root, wherein in scaling includes dividing the square root by a second fixed scale value to increase the precision of the square root.

3. The square root calculator of claim 1 further comprising:
    a lower boundary condition module operable to determine whether the number is zero and setting the square root equal to zero if the number is zero.

4. The square root calculator of claim 1 further comprising:
   an upper boundary condition module operable to determine whether the number is a maximum value and setting the square root equal to the square root of the maximum value.

5. The square root calculator of claim 1 further comprising a fixed-point microprocessor having a register storing the integer portion and the fractional portion, wherein the integer portion is stored in a set of most significant bits of the register and the fractional portion is stored in a set of least significant bits of the register.

6. The square root calculator of claim 1 wherein the binary search module includes a delay module operable to delay the returning of the integer portion so that time to perform the binary search operation is substantially consistent for each iteration.

7. An apparatus operable to accept a number, perform a binary search operation, and return an integer portion of the square root of the number; operable to calculate a fractional portion of the square root; and operable to awn the integer portion and the fractional portion to obtain the square root.

8. The apparatus of claim 7 further comprising:
   an actuator arm rotatably mounted adjacent a storage medium;
   a transducer head mounted on the actuator arm for reading and writing data from and to the storage medium, the transducer head moving at a velocity relative to tracks on the storage medium as the actuator arm moves; and
   a means for calculating a velocity reference by calculating a square root for use in adjusting the velocity of the transducer head to achieve the velocity reference.

9. The apparatus of claim 8 wherein the storage medium includes a plurality of tracks and the means for calculating the velocity reference includes a seek profile generator for generating a velocity profile while the transducer head moves from a first track to a second track.

10. The apparatus of claim 9 wherein the seek profile generator includes a velocity reference generator operable to calculate the square root of a squared velocity value that is in part a function of a position error, wherein the position error is the difference between the first track and the second track.

11. The apparatus of claim 10 wherein the squared velocity value is further a function of a deceleration constant.

12. The apparatus of claim 11 wherein the seek profile generator further comprises a constant deceleration generator operable to calculate the deceleration constant based in part on an initial seek distance.

13. The disc drive of claim 8 wherein the means for calculating the velocity reference comprises:
   a calculating module operable to receive the position error and the deceleration constant and perform the function to yield the squared velocity value;
   a binary searching module operable to receive the squared velocity value and returning an integer portion of the velocity reference;
   a fraction calculating module operable to calculate a fractional portion of the squared velocity reference; and
   a summing module operable to sum the integer portion and the fractional portion to obtain the velocity reference.

* * * * *